UNITED STATES PATENT OFFICE.

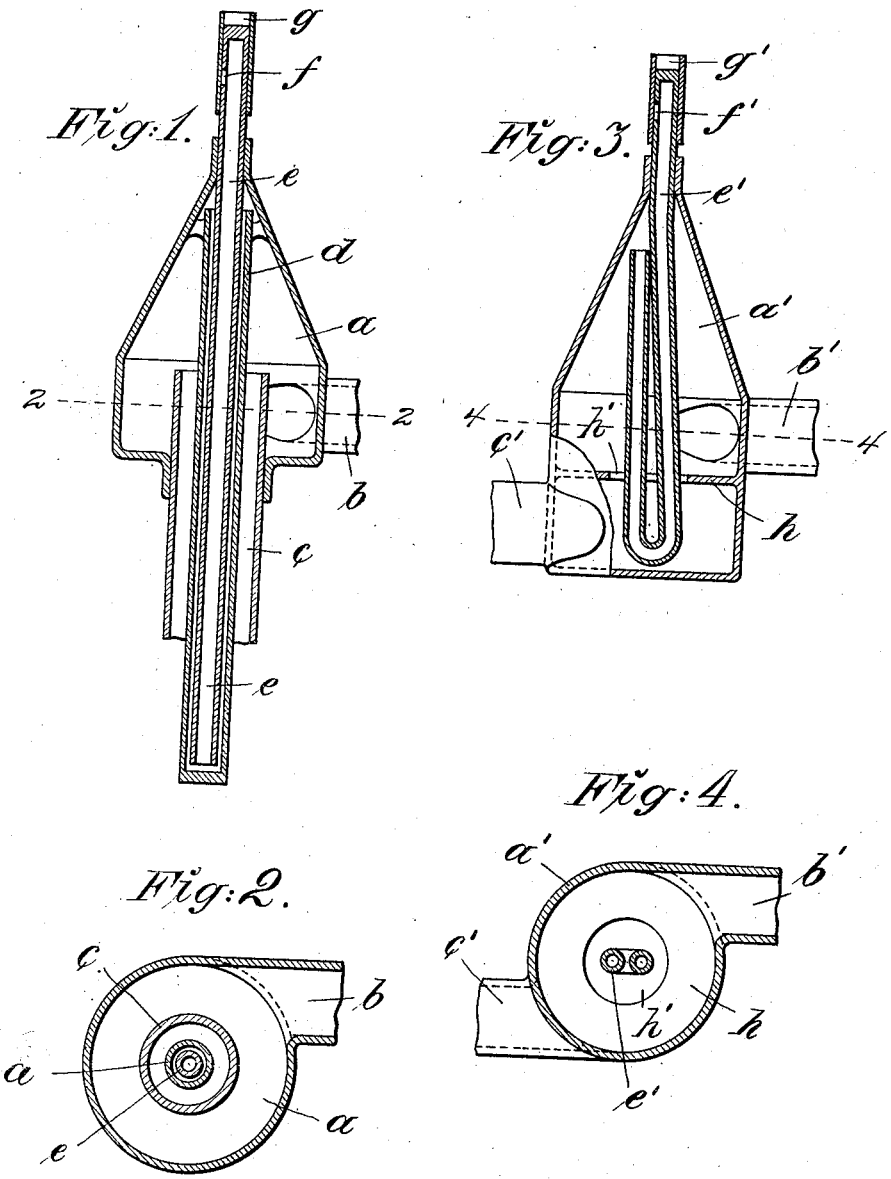

FREDRIK LJUNGSTRÖM, OF STOCKHOLM, SWEDEN, ASSIGNOR TO AKTIEBOLAGET SEPARATOR, OF STOCKHOLM, SWEDEN.

MILKING-MACHINE.

No. 812,855.                    Specification of Letters Patent.                    Patented Feb. 20, 1906.

Application filed November 11, 1905. Serial No. 286,897.

*To all whom it may concern:*

Be it known that I, FREDRIK LJUNGSTRÖM, a subject of the King of Sweden, residing at Stockholm, Sweden, have invented certain new and useful Improvements in Milking-Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to improvements in milking-machines and is adapted for use in a machine of the type set forth in the United States Letters Patent No. 784,693, granted to me March 14, 1905. In that patent is shown a milking-machine consisting of a set of pistons moving in cylinders and acting successively upon the teats, thereby pressing them against a fixed resisting body or abutment, whereby the milk is extracted. The pistons are moved by means of the streaming energy of a body of liquid contained in a conduit communicating with the cylinders of the milking organ and brought in a streaming motion to and fro by means of a pump or the like in such a way that the liquid is alternately forced into the cylinders and sucked out from them.

If in milking-machines of the type specified the conduit connecting the pump with the milking device be of any considerable length it becomes necessary to provide means for separating the air from the liquid, for the air-mixed liquid will act as a resilient body, thereby causing a loss of energy. Said loss of energy may be so great that only a small amount of the energy developed on the pump will act upon the pistons.

My present invention consists, broadly, therein that the liquid on moving to and fro in the conduit is caused to pass through a separating vessel coupled to said conduit, where it is brought to rotate or to eddy, whereby the lighter constituent (the air) amasses at the center of the vessel, while the heavier constituent (the liquid) on account of the centrifugal force is pressed against the walls of the vessel and is further reconducted into the conduit.

In the accompanying drawings, Figure 1 is a longitudinal vertical section of a device constructed in accordance with my invention; Fig. 2, a horizontal cross-section taken on line 2 2, Fig. 1; Fig. 3, a longitudinal vertical section of a modified form of my device; and Fig. 4, a horizontal cross-section taken on line 4 4, Fig. 3.

Referring to Figs. 1 and 2, $a$ indicates a vessel adapted to be coupled to two sections of a liquid-conduit, (not shown,) said vessel having a lower cylindrical portion and an upper conical portion. Liquid flows into the lower cylindrical portion of the vessel through a tube $b$, which enters the vessel tangentially, whereby the liquid is given a centrifugal movement. If the centrifugal force of the movement is sufficient, a separating process will take place, the heavier constituents (the liquid) will be thrown out toward the periphery of the vessel, and when the liquid has reached a certain height it will escape through a tube $c$, mounted axially in the vessel, while the lighter constituent (the air) amasses at the center in the conical portion of the vessel $a$. The air is conveyed from the vessel by means of pipes $d$ and $e$, which latter communicates with the atmosphere through the apex of the conical portion. The pipe $e$ extends through said apex and down through the bottom of the vessel and is open at the bottom, through which it communicates with the pipe $d$, which surrounds it. The pipe $d$ is closed at its bottom and extends up and opens into the top part of the conical portion of the vessel $a$. For the purpose of preventing water from escaping through these pipes they have such relative dimensions that only a small space is left between them and a great resistance is offered against the escape of liquid in this way. For preventing air from being sucked into the vessel $a$ through pipes $e$ and $d$ the pipe $e$ may be provided with a single-way valve of the Dunlop type, which consists of a rubber tube $g$, skutting a port $f$ in said pipe $e$. By this arrangement the air is forced out through the pipes $d$ and $e$ during the force period, while, on the contrary, no air can be sucked into the vessel during the suction period.

In the modification shown in Figs. 3 and 4 a pipe $e'$ passes from the top of vessel $a'$ down to the bottom and is then bent back onto itself and rises to the top of the vessel. This end of the pipe is open, and in this case the resistance is due to the small diameter of the pipe. A further resistance for preventing water from escaping through the pipe $e'$ may also be effected by bending the pipe several times or by inserting partition-walls therein or the like. This pipe, like the pipe $e$, is provided with a single-way valve $g'$, covering a port $f'$ for the purpose of preventing air from being sucked into the vessel. The feed-tube $b'$, as well as the delivery-tube $c'$, open tangentially into the vessel, the tube $b'$ being above the tube $c'$. A partition-wall $h$, having a central opening $h'$, divides the lower cylindrical part of the vessel into two chambers. This construction works in the same way whether the liquid flows in one direction or the other.

I claim—

1. In a device of the character specified, the combination with a feed-tube and a delivery-tube, of a vessel interposed between said tubes and adapted to impart a centrifugal movement to liquid supplied thereto, and means to vent from the vessel air separated from the liquid therein by the centrifugal movement thereof.

2. In a device of the character specified, the combination with a feed-tube and a delivery-tube, of a vessel interposed between said tubes adapted to impart a centrifugal movement to liquid supplied thereto, and a conduit in said vessel to convey therefrom the air separated from the liquid by the centrifugal movement of the latter.

3. In a device of the character specified, the combination with a feed-tube and a delivery-tube, of a vessel interposed between said tubes and adapted to impart a centrifugal movement to liquid supplied thereto, an air-chamber in the vessel above said tubes, and a conduit to establish communication between the chamber and atmosphere.

4. In a device of the character specified, the combination with a feed-tube and a delivery-tube, of a vessel interposed between the tubes and adapted to impart a centrifugal movement to liquid supplied thereto, a tube in the vessel to convey air from the latter, and a valve on said tube operable by the air therein.

5. In a device of the character specified, the combination with a feed-tube and a delivery-tube, of a vessel interposed between the tubes and adapted to impart a centrifugal movement to liquid supplied thereto, an air-chamber in the vessel, an air-conduit leading from near the top of the chamber down into the vessel and communicating with the atmosphere, and a valve on the conduit operable by the air therein.

6. A device of the character specified comprising a vessel having an air-chamber in its top, a tube opening tangentially into the vessel, a tube axially mounted in the latter, a conduit within the latter tube extending through the top of the vessel and a conduit closed at one end opening into the air-chamber and surrounding the aforesaid conduit.

7. A device of the character specified comprising a cylindrical vessel having a conical chamber mounted thereon, a tube opening tangentially into the vessel, a tube axially mounted in the latter, a tube mounted concentrically within the latter tube extending out through the conical chamber, a valve on the outer end of said tube, a tube inclosing the latter tube closed at its bottom and extending to near the top of the conical chamber, for the purpose set forth.

In testimony that I claim the foregoing as my invention I have signed my name and in presence of two subscribing witnesses.

FREDRIK LJUNGSTRÖM.

Witnesses:
 CARL FRIBERG,
 HARRY ALBIHN.